United States Patent [19]
Wallingford

[11] Patent Number: 6,082,195
[45] Date of Patent: Jul. 4, 2000

[54] VEHICLE WHEEL SPEED SENSOR

[76] Inventor: Errol Wallingford, 1019 Lavender Lane, Sydenham, Ontario, Canada, K0H 2T0

[21] Appl. No.: 09/314,103

[22] Filed: May 19, 1999

[51] Int. Cl.[7] .................................................. G01P 15/00
[52] U.S. Cl. ........................ 73/514.16; 73/117.3; 73/488
[58] Field of Search .................... 73/117.3, 488, 73/514.16, 514.39; 324/179, 174

[56] References Cited

U.S. PATENT DOCUMENTS

| | | | |
|---|---|---|---|
| 4,779,694 | 10/1988 | Adams | 180/143 |
| 5,407,024 | 4/1995 | Watson et al. | 180/248 |
| 5,486,757 | 1/1996 | Easley | 324/174 |
| 5,704,444 | 1/1998 | Showalter | 180/247 |
| 5,767,767 | 6/1998 | Lima et al. | 340/438 |

*Primary Examiner*—Max Noori
*Attorney, Agent, or Firm*—David J. French

[57] ABSTRACT

A wheel speed sensor for wheels powered through a transaxle is mounted on the transaxle case. A preferred pickup arrangement senses the rotation of a CV joint positioned adjacent the transaxle case.

3 Claims, 2 Drawing Sheets

VEHICLE WHEEL SPEED SENSOR

FIELD OF THE INVENTION

This invention relates to sensors for detecting wheel speed. In particular, it relates to a wheel speed sensor for the front wheels of a car having front wheel drive.

BACKGROUND TO THE INVENTION

Wheel speed sensors for automobiles typically utilize an indexing disc mounted on a wheel and a pickup that detects the passage of marker elements carried by the disc as the wheel turns. This pickup can be mechanical, optical or magnetic.

A typical existing arrangement uses a multi-toothed, steel disc mounted on a wheel along with a pickup that detects the presence of magnetic material on a tooth, or its absence when over a gap. A Hall Field Effect proximity sensor is employed as the pickup. This is a device of choice because of its high reliability and ease of use.

In this typical existing system, measurements are made by counting multiple teeth for a fixed sampling interval. For accuracy the disc is relatively large and carries many teeth. Nevertheless, precision is limited by the number of teeth present on the disc.

Both the disc and pickup elements are carried by the wheel and axle support structure and are therefore separated from the vehicle chassis by the wheel suspension system. This creates the difficulties of providing flexible connectors to the wheel assembly carrying the sensor and exposes the sensor to road shocks.

In a front wheel drive vehicle mechanical power is transferred to the wheels through a transaxle. This occurs through shafts that include constant velocity—"CV—" joints. This type of power train provides an opportunity to simplify the arrangement by which front wheel speed on a front wheel drive car can be measured.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In one of its aspects, the invention comprises a wheel speed sensor for a front wheel drive vehicle having a transaxle case mounted on the vehicle chassis and linkages including CV joints connected between the transaxle case and the wheels. A pickup for sensing rotation is mounted on the exterior of the transaxle case. The pickup senses the rotation of a component in the drive linkages, extending from the transaxle case, and thereby the rotation of the wheels. The sensed rotating element is preferably mounted adjacent the transaxle shaft as it protrudes from the transaxle case. In many cases, a component of the first CV joint mounted on the transaxle shaft may be used to sense wheel speed.

A typical CV joint has an outer round casing or sleeve with three scalloped or indented portions uniformly distributed about the circumference. The edges of these indentations may be sensed by a Hall detector device as the edges pass by the detector, disrupting its magnetic field. In a transaxle situation, when this scalloped casing portion of a CV joint rotates co-axially with the transaxle shaft protruding from the transaxle's case, then passage of the edges of the indentations may serve as markers which are easily be sensed by a detector mounted on the transaxle case and positioned to lie adjacent the rotating casing.

When a Hall Field Effect sensor is placed adjacent to a continuous portion of the CV sleeve or casing, it produces a constant low output signal. The arrival of the scalloped or indented portion which lacks magnetic material will turn the signal high. The duration of the high portions and the low portions may not be of equal length but this is irrelevant. All that is required is to measure the time duration for one complete high followed by one complete low, or vice versa, to determine the rotational velocity. Preferably, however, the time duration between a first transition and a third transition provides a higher accuracy measurement to determine rotation velocity.

In this manner, wheel speed may be sensed by a sensing system that is carried by the chassis, avoiding the cost and inconvenience of a wheel-mounted arrangement. While reference has been made specifically to a transaxle case, the invention may be employed with any transmission system that includes rotating linkages extending between a transmission and a wheel.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
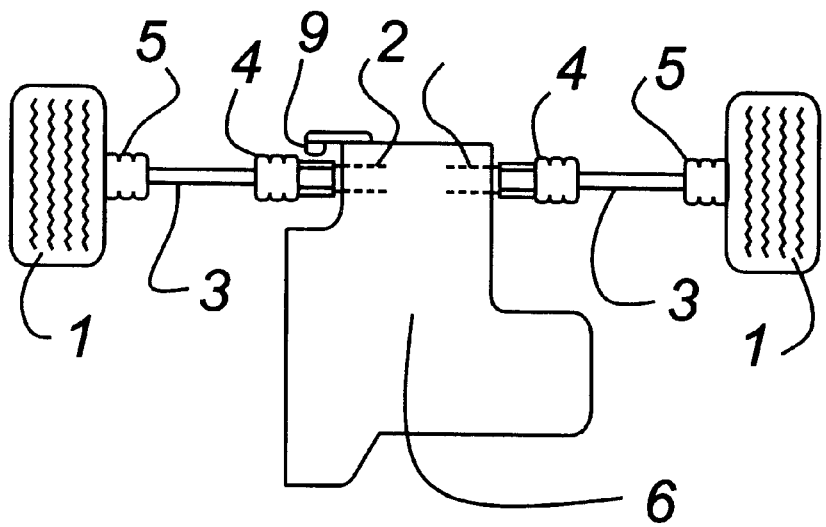
FIG. 1 is a schematic plan view diagram of a transaxle system driving the wheels of a vehicle through mechanical linkages including CV joints.
Figure 2:
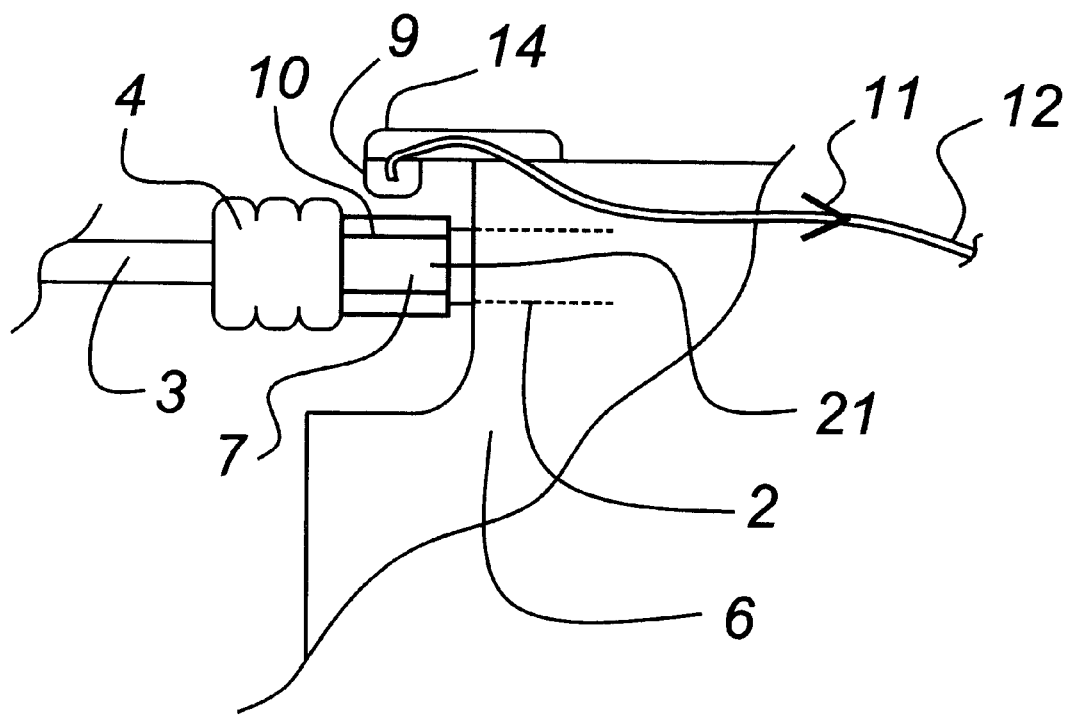
FIG. 2 is a close-up plan view of one side of the transaxle portion of FIG. 1.

In FIG. 1 wheels 1 are connected to transaxle shafts 2 through drive shafts 3. CV joints 4, 5 are connected at the ends of transaxle shafts 2, extending from the transaxle case 6.

Figure 3:
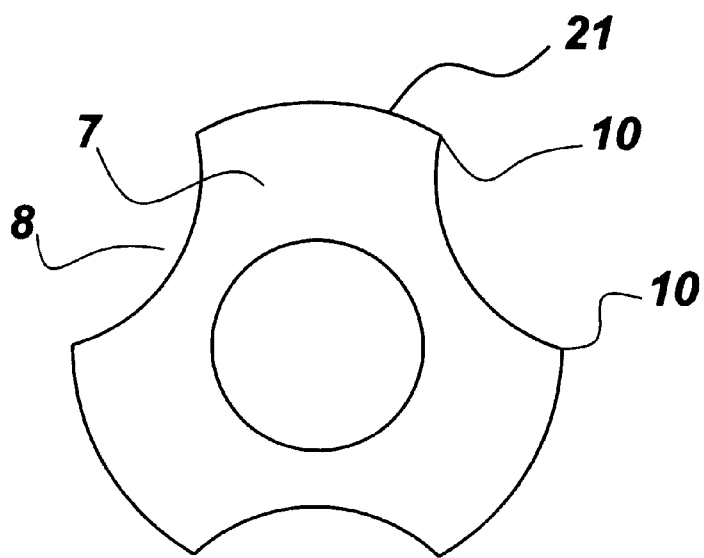
FIG. 3 is an end view of the scalloped sleeve or case on a CV joint.

The CV joint 4 mounted at the transaxle shaft 2 has a sleeve 7 interrupted by scalloped cut-out portions 8 leaving lobes 21 (shown in end view in FIG. 3). This sleeve 7 is mounted to rotate coaxially with the protruding portion of the transaxle shaft 2.

A sensing device 9 operating on the basis of the Hall effect is mounted by a support 14 on the transaxle case 6. This sensor 9 is positioned to lie adjacent the sleeve 7 at its portions 8 which are cut-out as the sleeve rotates. As the edges 10 of the cut-out portions move past the sensor 9, they serve as markers which disrupt its magnetic field, creating an electrical signal 11 in a field coil carried within the device 9. These signals 11 are carried-off by wires 12 for processing by a processor 13.

Because of the mechanics at linkages provided by the drive shaft 3 and cv joints 4, 5, the sleeve 7 turns at the same rotational speed as the wheels 1. Any measurement made of the rotational speed of the sleeve 7 therefore is a measure of wheel speed.

Figure 4:
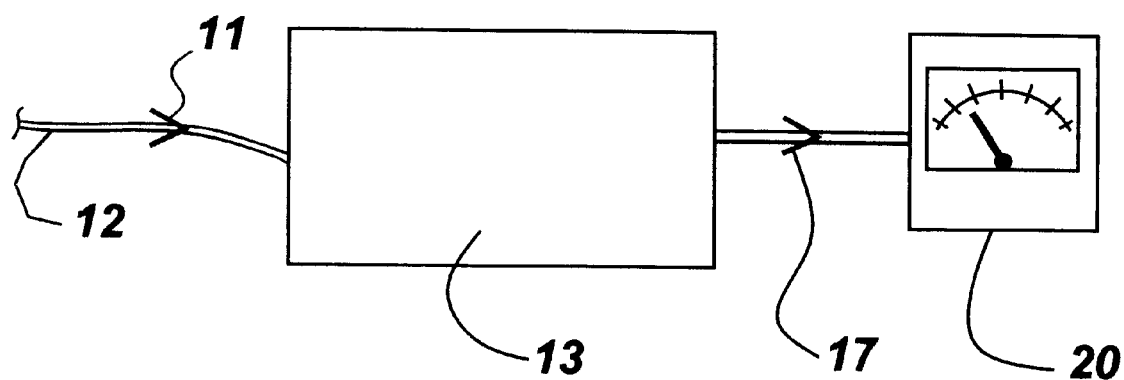
FIG. 4 is a data flow diagram depicting the provision of a wheel speed signal from the arrangement of FIG. 1.

In FIG. 4 the signal 11 is processed in the processor 13 which compares the duration between the arrival of pulses from the sensor 9 to an internally established clock rate and provides as an output a signal 17 to display 20 to provide a measure of wheel speed.

The preferred form of processor operation may be based on detecting three transitions. The processor will wait for a first transition before starting to store counts in a zeroed counter. The counts can be provided by the clock signal of a simple basic microprocessor. The processor continues storing counts until a second transition is encountered. It will note the changed state and continue counting until a third transition takes place. The elapsed time is accurately recorded as the total number of counts of known duration occurring between the first and third transitions.

All microprocessors operate at a fixed, known, clock cycle rate through the use of precise crystal frequency oscillators. As the crystal frequency is generally high, e.g. 2 megahertz good accuracy may be achieved. This provides very high precision for the measurement of elapsed time in the sampling interval. The precision achievable by this method exceeds that provided by an indexing disc with teeth.

There are two special situations which arise in the practical application of this type of speed sensor procedure. The first arises for very low speed or stopped vehicles. If the accumulated count exceeds a preset limit the vehicle is considered stopped. This limit can be set as the longest permitted measurement time for a very slow moving vehicle.

A second special procedure may be needed when making speed measurements of vehicles on a bumpy road. If, at the moment when a measurement interval is just starting, a bad bump to the vehicle may cause a multiple e.g. a triple, transition signal to a very low number of timing counts indicating an be generated by the sensor. Such an event would correspond to impossibly high wheel rpm. This type of possible error is easily avoided by testing for close transition intervals, rejecting the corresponding output as not being a valid speed measurement and relying on the next measurement. Alternately, dual confirming readings may be relied upon. Since the time for obtaining a second sample reading is extremely small, particularly when the vehicle is travelling at a substantial speed, overall measurement time is increased by a negligible amount.

While a sleeve portion 7 of the CV joint 4 is preferably used to activate the sensor 9, an indexing disc or other equivalent structure carried by transaxle shaft 2 to provide rotational markers could also be provided. Alternate sensing devices 9 could also be employed. The invention relies on the detection of an external rotating mechanical component that turns co-axially with the transaxle shaft 2, such rotation being sensed by a device mounted on the transaxle case.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

What is claimed is:

1. A wheel speed sensor for a wheeled vehicle having a transmission case mounted on the vehicle chassis and a rotary linkage including a CV joint connected between a shaft protruding from the transmission case to a wheel of the vehicle, said sensor comprising a pickup for sensing rotation, said pickup being mounted externally on the transmission case and positioned to detect the rotation of said protruding shaft and provide an output signal corresponding thereto wherein the CV joint has an outside steel sleeve that is interrupted by indentation portions to provide lobes that provide edges which serve as rotational markers, the pickup being positioned to sense the passage of said edges and provide an output signal that corresponds to the passage of said markers, said sensor further comprising an electronic processor wherein the output signal of the pick-up is coupled to said processor and the delay between detection of the passage of two consecutive markers past the detector is measured by the processor by reference to a clock signal to provide a speed output which is an indication of wheel speed.

2. A sensor as in claim 1 wherein the transmission is the transaxle of a front-wheel drive vehicle.

3. A sensor as in claim 1 wherein the pickup is a Hall detector device that provides an electrical output signal as the markers pass by the pickup.

* * * * *